United States Patent [19]

Buric et al.

[11] 4,333,097
[45] Jun. 1, 1982

[54] VISUAL DISPLAY TERMINAL WITHOUT FINGER REPOSITIONING

[75] Inventors: Milorad R. Buric, Chatham; Nicholas F. Maxemchuk, Mountainside, both of N.J.

[73] Assignee: Bell Telephone Laboratories, Incorporated, Murray Hill, N.J.

[21] Appl. No.: 186,424

[22] Filed: Sep. 12, 1980

[51] Int. Cl.³ ............................................. G09G 1/00
[52] U.S. Cl. ................................ 340/711; 340/365 R; 340/721
[58] Field of Search ................... 340/365 R, 721, 711, 340/712

[56] References Cited

U.S. PATENT DOCUMENTS

| | | |
|---|---|---|
| 2,040,248 | 5/1936 | Dvorak et al. . |
| 3,381,276 | 4/1968 | James . |
| 3,428,747 | 2/1969 | Alferieff ........................... 340/365 R |
| 3,526,892 | 9/1970 | Bartlett et al. . |
| 3,633,724 | 7/1972 | Samuel . |
| 3,675,513 | 7/1972 | Flanagan et al. . |
| 3,833,765 | 9/1974 | Hilborn et al. . |
| 3,879,722 | 4/1975 | Knowlton . |
| 3,967,273 | 6/1976 | Knowlton . |
| 4,005,388 | 1/1977 | Morley et al. ................... 340/365 R |
| 4,067,431 | 1/1978 | Whitaker ......................... 340/365 R |
| 4,185,282 | 1/1980 | Pick .................................. 340/721 X |
| 4,193,119 | 3/1980 | Arase et al. ...................... 340/712 X |
| 4,200,913 | 4/1980 | Kuhar et al. . |

OTHER PUBLICATIONS

Norman Abramson; *Information Theory and Coding,* 1963, McGraw-Hill, pp. 34, 35.
Robert Parkinson; "The Dvorak Simplified Keyboard: Forty Years of Frustration," *Computers and Automation,* Nov. 1972, pp. 18-25.
Rochester, Bequaekt and Sharp, "The Chord Keyboard", *Computer;* (IEEE) vol. 11, No. 12, Dec. 1978, pp. 57-63.

*Primary Examiner*—David L. Trafton
*Attorney, Agent, or Firm*—Richard J. Roddy

[57] ABSTRACT

The subject terminal includes a keyboard (20) having a plurality of keys (30-1 through 30-10), each key adapted to accommodate a respective finger of the typist, and apparatus (100, 150) responsive to the depression of one of the keys for generating and displaying a symbol upon a cathode ray tube. Also displayed on the cathode ray tube is a replica (300, 701) of the keyboard and a plurality of symbols (310-1, 510-1, 610-1, et seq) representing different functions for each of the plurality of keys. By altering (702, 703, 704, 705, 706) the label in a key location on the replica, the function associated with that key, for example, the symbol displayed responsive to its depression, may be altered. Thereby the operator need not reposition his fingers among the keys.

2 Claims, 7 Drawing Figures

VISUAL DISPLAY TERMINAL WITHOUT FINGER REPOSITIONING

TECHNICAL FIELD

This invention relates to terminals and, more particularly, to visual display terminals including keyboards for generating or for displaying a greater plurality of symbols using a lesser plurality of keys.

BACKGROUND OF THE INVENTION

U.S. Pat. No. 3,967,273; issued June 29, 1976 and entitled "Method and Apparatus for Using Pushbutton Telephone Keys for Generation of Alpha-Numeric Information"; discloses a four column, three row pushbutton telephone keyboard by way of which a desired alpha-numeric symbol may be generated. The symbol is generated responsive to a two step finger repositioning process: (1) the operator locates and pushes a first button on which the desired symbol is labeled, each of the twelve buttons being labeled with at most a three-by-three array of symbols, and (2) the operator locates and pushes a second button, which second button is identified by the position of the desired symbol in the array labeled on the first button. The alpha-numeric symbols are arranged similar in layout to a standard typewriter keyboard thereby making it likely that anyone, who is familiar with the location of symbols on a typewriter keyboard, can quickly reposition his fingers to the desired symbol on the telephone keyboard. It is, however, no secret that the layout of symbols on the standard typewriter keyboard is an inefficient layout.

The typewriter originated as a purely mechanical device. Because of the crudity of its initial mechanical linkages, the symbols on the keys of early typewriters were intentionally positioned, or laid out, so as to slow the typist down to a speed compatible with the capabilities of the mechanical device. As a result, an awkward layout pattern is obtained. Unfortunately, the original awkward typewriter keyboard layout has persisted to the present time. A more efficient keyboard layout is disclosed in U.S. Pat. No. 2,040,248; issued May 12, 1936 to A. Dvorak et al. and entitled "Typewriter Keyboard." The Dvorak keyboard includes the letters being arranged in three rows. The upper row contains consecutively the letters p, y, f, g, c, r and l. The home row contains the letters a, o, e, u, i, d, h, t, n and s. The lower row contains the letters z, q, j, k, x, b, m, w and v. With that keyboard layout, Dvorak sought to produce an arrangement of the keys (having in mind the letter sequences found in the most commonly used words of a language) such that the automatic rhythm of the operator, in moving from one key to another key while typing a continuous flow of word-wholes and phrases-wholes, would better fit the mechanical rhythm of the typewriter.

Of course, other keyboard layouts are possible. For example, U.S. Pat. No. 3,879,722; issued Apr. 22, 1975 and entitled "Interactive Input-Output Computer Terminal with Automatic Relabeling of Keyboard"; discloses an arrangement for transferring symbols by optical means from a television screen display to a telephone keyboard having twelve pushbuttons. The disclosed optical means is a semitransparent mirror, which is interposed between the television screen and the pushbutton keyboard and which is oriented in such a manner that the operator of the terminal sees a virtual image of the television screen image overlaying the keyboard. By altering the symbols on the television screen, the keyboard layout may be dynamically adjusted. As a result, a lesser plurality of keys may be automatically relabeled by dynamically adjusting and by optically transferring a greater plurality of computer generated graphical or alpha-numeric symbols from the television screen to the telephone keyboard. Unfortunately, it appears that the operator must pre-learn sequences of displays to effectively use the U.S. Pat. No. 3,879,722 keyboard. That is, what a next-in-time display should be is not evident from the current-in-time display. Also, such pushbutton telephone or typewriter keyboards require repositioning of the operator's fingers in the use of the keyboard. Frequent repositioning of fingers consumes time and leads to an inefficiently operated keyboard.

To mitigate repositioning the operator's fingers among the keys, U.S. Pat. No. 3,633,724; issued Jan. 11, 1972 and entitled "Electric Typewriter Key and Keyboard Arrangement"; discloses a keyboard including eight keys, each key for generating five symbols and the keyboard for generating the 40 symbols common to a standard typewriter. Each key is arranged to be moved both axially and pivotally on the arcuate upper edges of a support member for selecting a respective one of the five symbols generated by depressing the key. Unfortunately, such a keyboard is not easy to use, for example, by an operator who is not skilled with the keyboard or by one who requires more than an occasional glance at the key labels to determine the symbol to be generated, e.g., the so-called hunt-and-peck typist. Also, while a finger need not be moved among the keys as with a standard keyboard, a finger is moved on a key for axially and/or pivotally moving the key. Such moving of the finger on a key tends toward an awkward relationship among the fingers as different keys are moved in different directions.

SUMMARY OF THE INVENTION

These and other problems are solved in accord with the principles of our invention with an improved terminal including a keyboard having a plurality of keys and including apparatus responsive to the operation of one of the keys for generating and extending a symbol signal to visual display apparatus. Responsive to the symbol signal, the generated symbol is displayed upon the visual display apparatus. The terminal also includes an arrangement for producing a replica of the keyboard upon the visual display as well as for displaying a plurality of keyboard layout patterns thereon. Also, the plurality of keys are adapted for the various fingers of the operator so that the finger need not be repositioned. Rather, the function of a key may be altered as the label appearing on the replica of the keyboard pattern is altered.

BRIEF DESCRIPTION OF THE DRAWING

The various features of the present invention will be readily understood from the following detailed description when taken in conjunction with the drawing in which.

DETAILED DESCRIPTION

Figure 1:
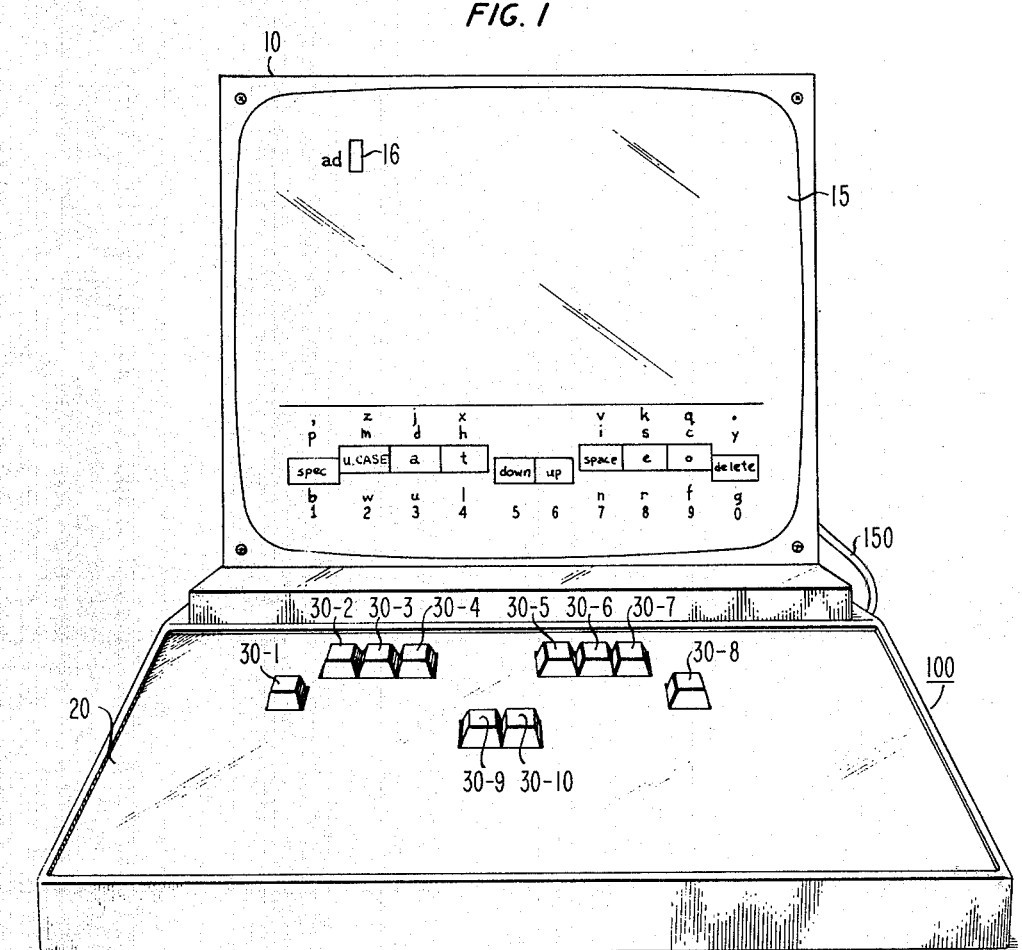
FIG. 1 illustrates a visual display terminal including a cathode ray tube (CRT) and a keyboard in accord with the principles of our invention.

FIG. 1 depicts an illustrative terminal for generating symbols and for displaying the symbols in accord with the principles of our invention. The terminal can be constructed using standard visual display terminal 10 having standard cathode ray tube (CRT) 15 for displaying the generated symbols. Housing 100, the illustrative details of which are depicted schematically in FIG. 2, includes keyboard 20, which, in turn, comprises a plurality of keys 30-1 through 30-10. The respective keys may be aligned in a row on the keyboard or, as here illustrated, staggered and adapted for readily accommodating the respective fingers and thumbs, herein called fingers unless otherwise noted, of the operator. For example, keyboard 20 may be a reconfiguration of a digital keyboard or of a standard multifrequency pushbutton telephone keyboard such as a TOUCH-TONE ® dialing telephone set with keys 30-1 to 30-4 being adapted for operation by the four left hand fingers, with keys 30-5 to 30-8 being adapted for operation by the four right hand fingers and with keys 30-9 and 30-10 being adapted for operation by the left and right thumbs, respectively. While the keys of keyboard 20 may be adapted for the fingers of the operator, the face plate of keyboard 20 may be adapted for resting the palms of the operator's hands.

Figure 2:
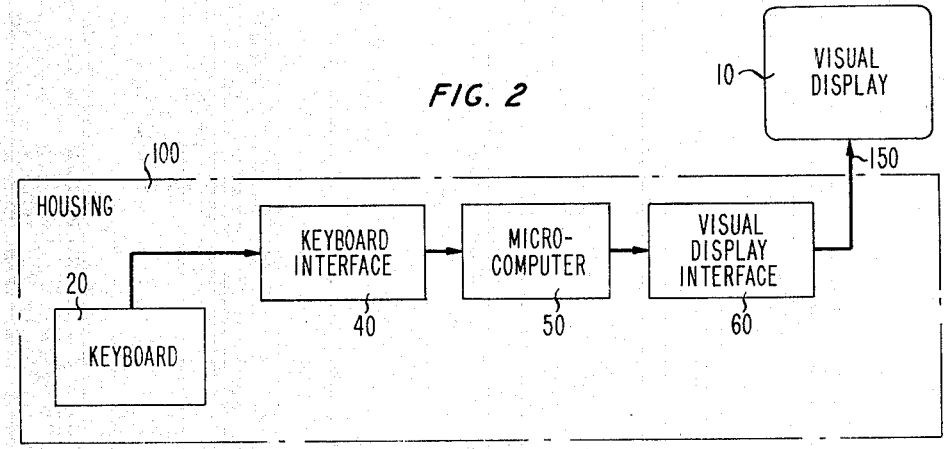
FIG. 2 illustrates in more specific schematic form the apparatuses and an interconnective relationship among the apparatuses illustrated in FIG. 1.

Functionally, one of the ten keys of keyboard 20 may be operated, e.g., by being depressed, for generating a symbol signal(s) representative of the one or more symbols to be displayed. Responsive thereto, as schematically illustrated in FIG. 2, a digital symbol signal may be extended from keyboard 20 through keyboard interface unit 40 to an input of microcomputer 50. Responsive to the digital signal, microcomputer 50 may extend a signal or a signal sequence representing the symbol or symbols including replica to be displayed through visual display interface unit 60 over cable 150 to an input of visual display 10 for displaying the one or more symbols on CRT 15.

While at first glance the aforedescribed configuration may appear known, some interesting aspects thereof mark our departure over the prior art.

Figure 3:
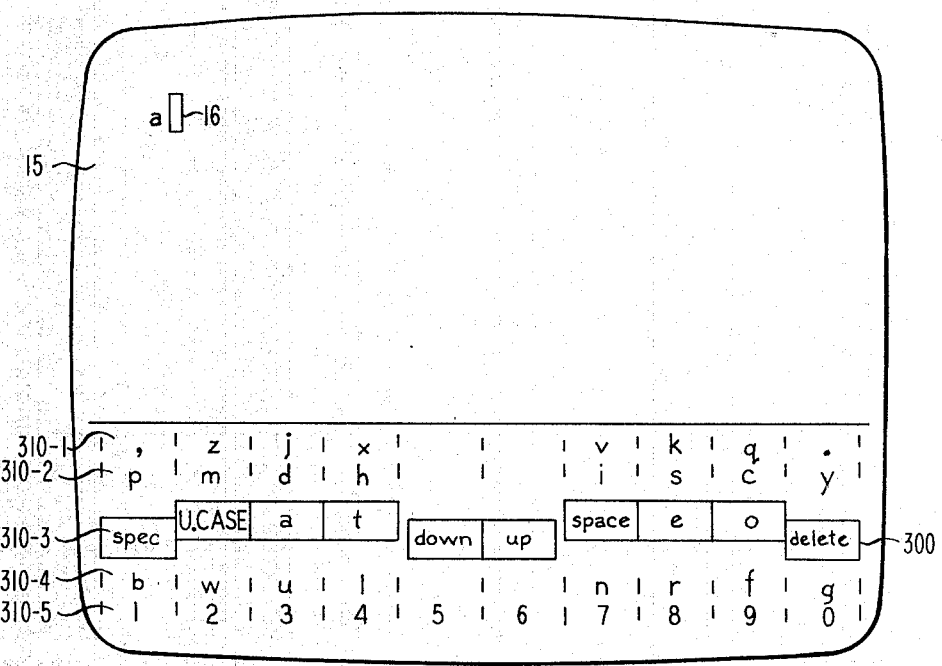
FIG. 3 illustrates a replica of the keyboard in FIG. 1 being displayed on the CRT as well as the labels of a lower case keyboard layout pattern thereupon in accord with the principles of our invention.
Figure 4:
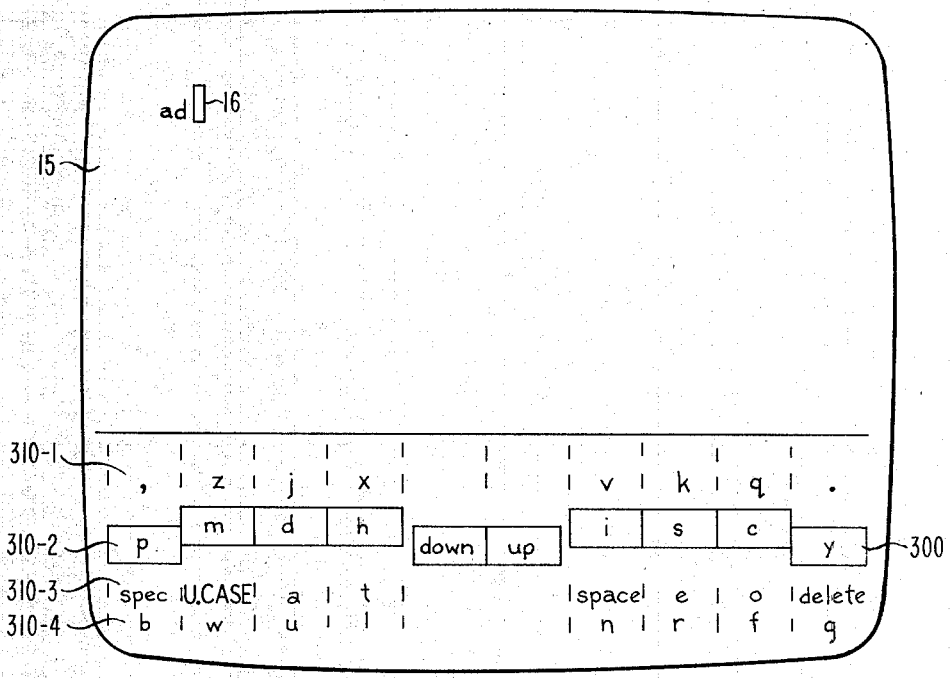
FIG. 4, which illustrates a downshift alteration of the labels on the replica shown in FIG. 3, is useful in describing the dynamic adjustment of the function of the keys of an illustrative embodiment in accord with the principles of our invention.

According to one aspect of our invention, the symbols to be generated and to be displayed may be arranged according to a keyboard layout pattern that may be dynamically adjusted and yet need not require the operator to pre-learn the sequence of displays and need not require the operator to reposition his fingers. For example, unlike a standard typewriter keyboard or pushbutton telephone keyboard, which usually have symbols labeled directly thereon for identifying the symbol to be generated by each respective key, our keyboard 20 need not be labeled direct thereon. Rather, the operator's fingers remain on the respective keys while a graphical replica of keys 30-1 through 30-10, here replica 300 in FIG. 3 includes ten generally rectangular polygons, may be displayed on the lower part of CRT 15. Replica 300 may be generated using standard graphical display techniques to provide replica producing task 701, which operates in cooperation with microcomputer 50 and interface units 40 and 60 for displaying rectangular polygons on CRT 15. Further, the label of the function of each respective key may be displayed in a respective polygon of replica 300. For example, in FIG. 3, the labels in row 310-3 i.e., spec, U.CASE, a, t, down, up, space, e, o, delete, are displayed in the respective polygons of replica 300. Still further, as the function of a key changes, its label on replica 300 also changes. For example, we start with a default layout pattern, e.g., here we start with a default pattern including the labels of row 310-3 being displayed on replica 300 as shown in FIG. 3. Then, responsive to a depression of key 30-9, here labeled down, the labels in row 310-2 move down one row replacing the labels in row 310-3 as shown in FIG. 4, i.e., here the labels on replica 300 are replaced with p, m, d, h, down, up, i, s, c, y. Thereby the operator of our improved keyboard 20 need not reposition his fingers on the keyboard. Instead, a change of the labels on the replica, and concomitantly a change of the functions of the keys, may occur. For example, the specific labels to be displayed on replica 300 may be generated using standard graphical display techniques to provide key function altering task 702, which operates in cooperation with various keyboard layout tasks such as lower case layout task 703, upper case layout task 704, and special symbol layout task 705 as well as with microcomputer 50 and interface units 40 and 60 for displaying the label of the function of each respective key in a respective polygon of replica 300. Still, even further, rather than have the operator reposition his fingers among rows of keys to accomplish different functions, each key may have a plurality of functions which are dynamically adjusted and involve no repositioning of the operator's fingers. Also, the sequence of displays is displayed on CRT 15 to obviate the need for the operator to pre-learn the sequences.

More specifically, the screen of CRT 15 may be divided into an upper part and a lower part. The generated symbols may be displayed in the upper part of the screen, the next symbol being displayed wherever generally rectangular cursor 16 may be situated. Concurrently, replica 300 of our keyboard, as illustrated in FIG. 3, may be displayed in the lower part of the screen. It may be observed that FIG. 3 includes several rows of labels 310-1 through 310-5, which may be generated through lower case keyboard layout task 703. Initially the keys of our keyboard 20 have the functions illustrated by the labels in row 310-3, here called the default layout pattern. Notwithstanding, two or more rows, here five rows, may be displayed on the screen. Thereafter, it being noted that the letter a is shown in the replica polygon location of key 30-3, responsive to a depression of key 30-3, the letter a is generated through lower case task 703 and displayed in the upper part of the screen at a location specified by the location of cursor 16. Cursor 16 is then moved through cursor movement task 706 to a location where the next symbol is to be displayed and the default layout pattern of FIG. 3 remains displayed. Other symbols may be subsequently generated and displayed following a tree-like process. To illustrate, depression of left thumb key 30-9, here labeled down, leads to a downshift of the respective label rows such that, for example, the labels in row 310-2 appear on replica 300 as illustrated in FIG. 4 while the labels of label row 310-5 disappear off the bottom of the screen. Thereafter, the functions associated with the respective keys of our keyboard 20 are as labeled on replica 300 in FIG. 4. For example, it being noted that the letter d is shown in the replica polygon location of key 30-3, responsive to a depression of key 30-3, the letter d is generated through lower case task 703 and displayed in the upper part of the screen at a location specified by the location of cursor. Thereafter, the lower case default layout of FIG. 3 reappears in the lower part of the screen. In parallel fashion, two consecutive depressions of key 30-10, here labeled up, leads to a double upshift of the respective label rows such that, for example, the labels in row 310-5 appear on replica 300 while label rows 310-1 and 310-2 disappear off the top of the screen. Thereafter, it being noted that the number 3 is shown in the replica polygon location of key 30-3, responsive to a depression of key 30-3, the number 3 is generated through lower case task 703 and displayed in the upper part of CRT 15.

Hence, our keyboard 20 may require two or more depressions, or strokes, of the keys to generate a particular symbol. Also, after the symbol is generated and usually displayed, the lower case default keyboard layout pattern of FIG. 3 reappears on CRT 15. Thusly, the default layout pattern is a layout pattern to which the key functions return after a symbol is generated. As a result, the operator begins typing each symbol with the default pattern of FIG. 3 on the lower part of the screen and need not remember how he got to the pattern presently displayed on the lower part of the screen. Notwithstanding, as later described, a lock feature may override the described default pattern.

According to a second aspect of our invention, our keyboard layout pattern allows for more efficient use of the keyboard. For example, unlike the awkward standard typewriter keyboard layout, our improved keyboard layout obtains after due consideration as to the relative frequency of the symbols to be generated and as to the relative strength of the various fingers of the typical operator. Studies have been made as to determining the relative frequency of symbols common to the English language. According to one study, the following tabulates the frequency of symbols common in the English language:

| Symbol | Frequency | Symbol | Frequency |
|--------|-----------|--------|-----------|
| Space  | 0.1859    | N      | 0.0574    |
| A      | 0.0642    | O      | 0.0632    |
| B      | 0.0127    | P      | 0.0152    |
| C      | 0.0218    | Q      | 0.0008    |
| D      | 0.0317    | R      | 0.0484    |
| E      | 0.1031    | S      | 0.0514    |
| F      | 0.0208    | T      | 0.0796    |
| G      | 0.0152    | U      | 0.0228    |
| H      | 0.0467    | V      | 0.0083    |
| I      | 0.0575    | W      | 0.0175    |
| J      | 0.0008    | X      | 0.0013    |
| K      | 0.0049    | Y      | 0.0164    |
| L      | 0.0321    | Z      | 0.0005    |

-continued

| Symbol | Frequency | Symbol | Frequency |
|--------|-----------|--------|-----------|
| M      | 0.0198    |        |           |

Studies have also been made as to determining the relative strengths of the eight fingers usually used in typing. According to one study, the following recites, from strongest to weakest, the rank order of the relative strengths of the eight typing fingers:
1. Right index finger;
2. Right middle finger;
3. Left index finger;
4. Left middle finger;
5. Right ring finger;
6. Left ring finger;
7. Right little finger; and
8. Left little finger.

Our improved keyboard layout pattern, as illustrated in FIG. 3, obtains from balancing the relative frequency of symbols common in the English language with the relative strengths of the operator's fingers. For example, it may be noted that, when comparing the aforecited frequencies of symbols with the default keyboard layout of FIG. 3, the symbols in label row 310-3 include the higher frequency symbols. As a result, the higher frequency symbols require a lesser number of strokes for generating the symbol. In parallel fashion, label rows 310-2 and 310-4 include symbols with correspondingly lower frequencies than the symbols in label row 310-3 and yet include symbols with correspondingly higher frequencies than the symbols in label rows 310-1 and 310-5. Also, with our improved keyboard layout pattern and for representative English text, the relative frequency of using the aforedescribed eight fingers is about 0.3140, 0.2050, 0.1597, 0.1187, 0.1058, 0.0373, 0.0316, and 0.0279, respectively, clearly consistent with the rank order of the relative strengths of the eight typing fingers.

As aforedescribed, because of the upshift or downshift of the rows of labels, two or more key strokes may be required to generate and have displayed a particular symbol when using our keyboard. English text studies with our improved keyboard 20 indicate that, on average, the keyboard layout pattern of FIG. 3 requires about 1.5 strokes per symbol. Importantly however, our keyboard does not require repositioning of the fingers on the keyboard. Further, our keyboard layout pattern obtains after due consideration as to the relative frequency of the symbols to be generated and as to the relative strengths of the operator's fingers. Hence, our keyboard allows for more efficient use.

Figure 5:
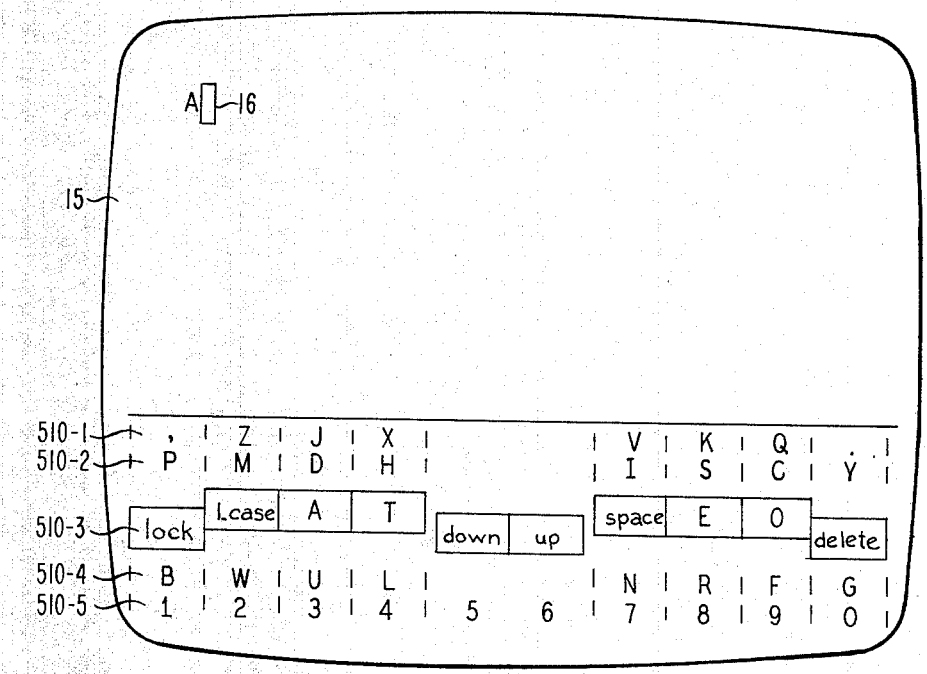
FIG. 5 illustrates a replica of the keyboard in FIG. 1 being displayed on the CRT as well as the labels of an upper case keyboard layout pattern thereupon in accord with the principles of our invention.
Figure 6:
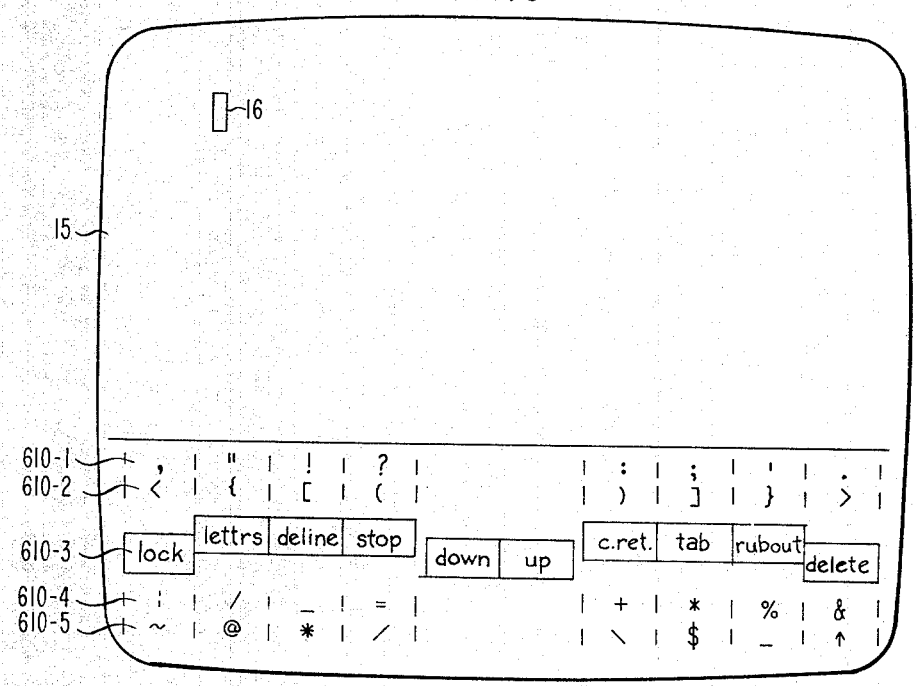
FIG. 6 illustrates a replica of the keyboard in FIG. 1 being displayed on the CRT as well as the labels of a special character keyboard layout pattern thereupon in accord with the principles of our invention.
Figure 7:
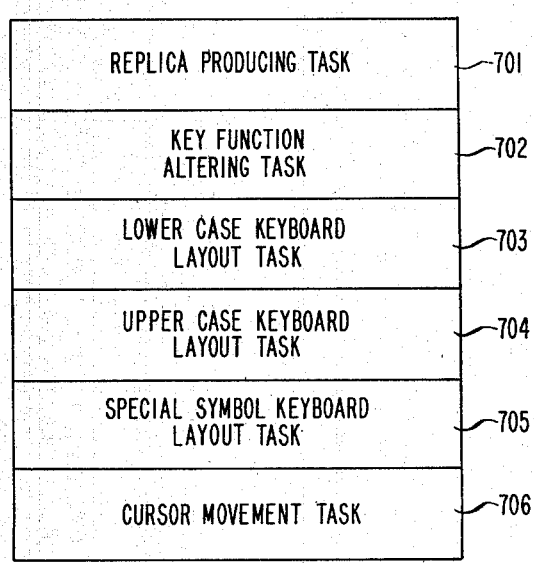
FIG. 7 illustrates some typical tasks, which may be embodied in the illustrative housing of FIG. 2.

According to a third aspect of our invention, still other symbols may be generated and displayed on visual display terminal 10. For example, FIG. 5 illustrates an upper case keyboard layout pattern similar to the lower case keyboard pattern illustrated in FIG. 3. The upper case symbols shown in label rows 510-1 through 510-5 of FIG. 5 parallel the lower case symbols shown in label rows 310-1 through 310-5 of FIG. 3. The upper case labels may be generated using standard graphical display techniques to provide upper case layout task 705. Thereafter, the keyboard layout pattern of FIG. 5 is displayed on CRT 15 responsive to a depression of key 30-2 when replica 300 includes label row 310-3, that is, when replica key 30-2 is labeled U.CASE. On the other hand, keyboard layout pattern of FIG. 3 is displayed on CRT 15 responsive to a depression of key 30-2 while replica 300 includes label row 510-3, that is, when replica key 30-2 is labeled l.case. In our illustrative embodiment, the upper case layout pattern of FIG. 5 may be locked on the display responsive to a depression of key 30-1 when same is labeled lock. That is, the aforedescribed lower case default pattern of FIG. 3 is replaced, or locked out, by the upper case pattern of FIG. 5, row 510-3 of which becomes a new default pattern. Otherwise, after an upper case symbol has been generated and displayed, the default keyboard layout pattern of FIG. 3 may be displayed on CRT 15. Also, for example, as illustrated in FIG. 6, a special character keyboard layout pattern for generating and displaying various special characters through special symbol layout task 705 may be displayed for defining certain special functions of the ten keys. Specifically, the keyboard layout pattern of FIG. 6 may be displayed on CRT 15 responsive to a depression of key 30-1 when replica 300 includes label row 300-3, that is, when replica key 30-1 is labeled spec. Thereafter, keys 30-1 through 30-10 are altered to provide the functions implicit in the FIG. 6 keyboard layout pattern.

Although our invention has been described and illustrated in detail, it is to be understood that the same is by way of illustration only. Various modifications will occur to those skilled in the art. For example, not all the self-evident functions labeled in the drawing have been described nor have all possible functions been illustrated. It should be clear that other functions, for example, editing functions, may be assignable to the various keys of our terminal. It should also be clear that more or less than five rows of symbols may be displayed on the lower part of the screen. It should further be clear that, while the description of our improved terminal is as though the terminal were a stand-alone terminal, our terminal may be readily interconnected to a communication path for transmission of generated symbols to another terminal or to a computer and for reception of signals generated therefrom. Accordingly, the spirit and scope of our invention will be limited only by the appended claims.

We claim:

1. A terminal including
  a keyboard having a plurality of keys,
  means for producing a replica of said keyboard upon visual display apparatus,
  a first set of labels for identifying a first keyboard layout pattern, said first set being displayed on said replica, a label comprising a symbol, said symbol for identifying a function of a key associated with said label, a respective first symbol for identifying a first function of a respective one of said keys and
  characterized in that said terminal further comprises
  a second set of labels for identifying a second keyboard layout pattern,
  said second set being displayed in a position juxtaposed to said replica,
  said second set including an alternative second symbol for identifying a second function of said respective one of said keys;
  said first set and said second set being concurrently displayed on said visual display apparatus,
  means coupled to said replica producing means for altering the function of a key, said key function altering means including
  means for moving said alternative second symbol from said juxtaposed position and for displaying said alternative second symbol on said replica in place of said respective first symbol, and
  means responsive to the operation of the key associated with said first and said second symbols for replacing said first function with said second function;
  each key being adapted for operation by a respective finger of an operator of said terminal and
  each key being adapted for avoiding the repositioning of said fingers during the operation thereof and
  there being no more keys than there are fingers of an operator.

2. The terminal defined in claim 1 wherein said key function altering means further comprises
  means responsive to the operation of said key associated with said first and second symbols for restoring said keyboard layout to a default keyboard layout pattern.

* * * * *